United States Patent [19]

Elgie

[11] Patent Number: 4,467,007
[45] Date of Patent: Aug. 21, 1984

[54] WALL COVERING

[76] Inventor: Don R. Elgie, 14100 Doolittle Dr., San Leandro, Calif. 94577

[21] Appl. No.: 545,465

[22] Filed: Oct. 26, 1983

[51] Int. Cl.³ .......................... B32B 5/16; B32B 5/22
[52] U.S. Cl. ..................................... 428/142; 427/203; 427/296; 427/407.3; 428/317.5; 428/319.7
[58] Field of Search ................. 428/142, 317.1, 317.5, 428/317.7, 319.1, 319.7; 427/202, 203, 407.3, 294, 296

[56] References Cited

U.S. PATENT DOCUMENTS

| | | | |
|---|---|---|---|
| 3,619,343 | 11/1971 | Freeman | 428/142 |
| 3,725,191 | 4/1973 | Bloom | 428/319.1 |
| 4,397,906 | 8/1983 | Nakagawa et al. | 428/317.7 |

Primary Examiner—William J. Van Balen
Attorney, Agent, or Firm—Harris Zimmerman; Howard Cohen

[57] ABSTRACT

A flexible wall covering material and a process for manufacturing includes applying a thin foam layer to a flexible fiberglass fabric web. An adhesive is then applied to the foam layer to bond therewith, and the web is passed under hoppers which drop small aggregate and fine aggregate successively onto the adhesive layer. The web is then drawn through an oven which heats and cures the adhesive, securing the aggregate to the web. The web is passed under a vacuum hood which removes the loose aggregate, and a sealer is sprayed onto the aggregate surface of the composite. The sealer is dried by radiant heat to seal the stone material and emphasize its color, and the web composite is wound onto rolls for subsequent use as a wall covering, and especially an exterior wall covering.

6 Claims, 8 Drawing Figures

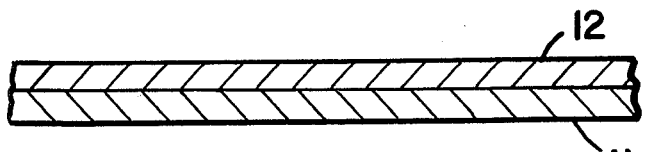
FIG_1
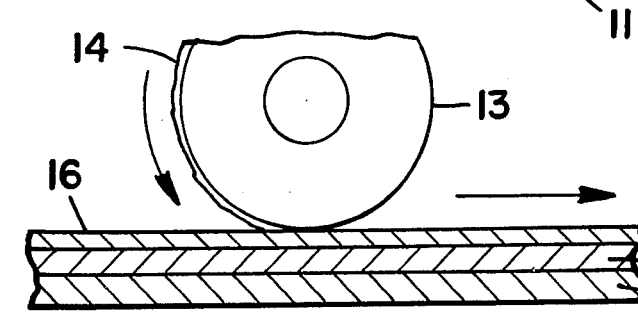
FIG_2
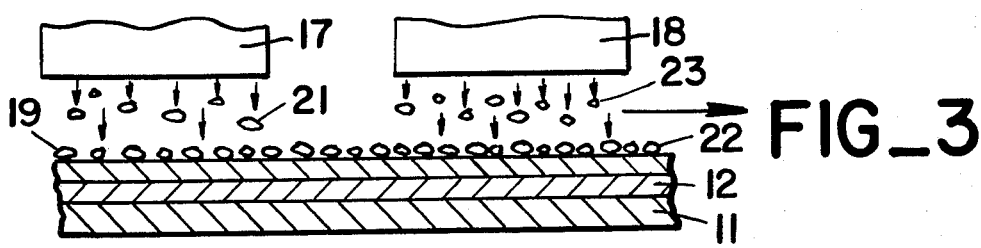
FIG_3
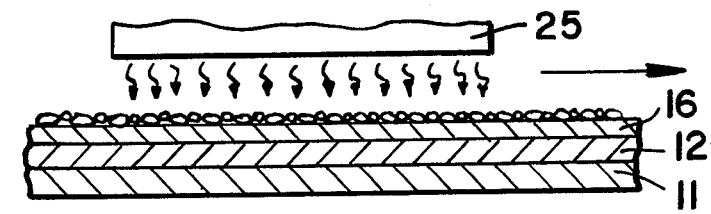
FIG_4
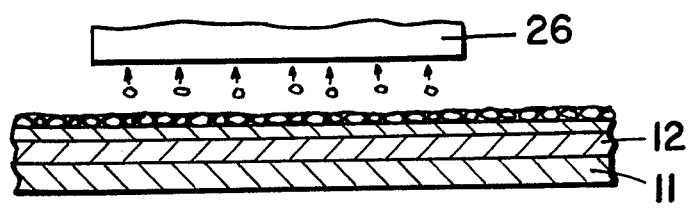
FIG_5
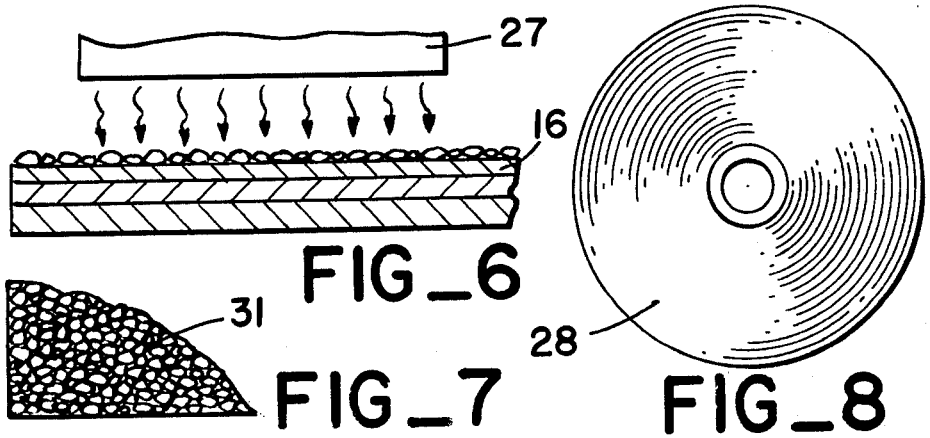
FIG_6  FIG_7  FIG_8

WALL COVERING

BACKGROUND OF THE PRESENT INVENTION

There are known in the prior art many modern techniques and materials for fabricating buildings and structures which are inexpensive yet sturdy and weatherproof. For example, buildings can be formed of tilt-up concrete slab walls fashioned on site on the concrete foundation slab of the building. The walls are reinforced, and the reinforcing rod is welded to join the structural panels to form a strong and permanent union.

Unfortunately, such buildings lack any architectural character or visual appeal. Thus such buildings are relegated to industrial parks and unzoned areas. Surface treatments of the wall panels, such as the inclusion of river rock or the like in the exterior surface, or surface texturing striations, are generally too expensive to justify their use in an inexpensive building. This unfortunate fact is equally true of other new building techniques and materials, such as plywood shells, geodesic domes, galvanized sheet metal construction, and the like.

SUMMARY OF THE PRESENT INVENTION

The present invention generally comprises a wall covering and method for manufacture thereof which is especially adapted to be used as an exterior wall covering on smooth outer structural surfaces, such as concrete, galvanized sheet metal, wood and plywood, and the like. The wall covering is durable and weatherproof, yet provides a textured surface of muted color which is easy to apply and inexpensive to manufacture.

The method of the present invention provides a flexible web of fiberglass or the like which is first coated with a thin foam layer. An adhesive is then sprayed onto the foam layer to bond therewith, and the web is passed under vibrating dropper hoppers which drop small aggregate and fine aggregate successively onto the adhesive layer. The web is then drawn through an oven which heats and cures the adhesive, securing the aggregate to the web. The web is passed under a vacuum hood which removes the loose unbonded aggregate, and a sealer is sprayed onto the aggregate surface of the composite. The sealer is dried by radiant heat to seal the adhesive and the stone material and emphasize its color, and the web composite is wound onto rolls for subsequent use as a wall covering, and especially an exterior wall covering.

BRIEF DESCRIPTION OF THE DRAWING

FIGS. 1–6 are a sequence of schematic views showing the steps of the method for fabricating the wall covering material of the present invention.

FIG. 1 depicts the web material that forms the base for the composite wall covering, a fabric coated with a thin dense foam layer.

FIG. 2 depicts the application of a liquid adhesive to one side of the web material.

FIG. 3 depicts the application of small and fine aggregate to the wet adhesive layer from shaker dropper hoppers.

FIG. 4 depicts the removal of the unbonded aggregate by vacuum means after heat is applied to the web composite to dry and cure the adhesive and bond the aggregate to the foam layer and the web composite.

FIG. 5 depicts the application of a sealer to the exterior surface of the composite to seal the adhesive layer and the stone and enhance the color of the aggregate.

FIG. 6 depicts the application of heat to dry the sealer compound.

FIG. 7 is a perspective view of the exterior surface of the wall covering material of the present invention.

FIG. 8 is an end view of a roll of the wall covering material of the present invention.

DESCRIPTION OF THE PREFERRED EMBODIMENT

The present invention generally comprises a wall covering especially adapted for exterior use, and a method for fabricating the wall covering of the present invention. With reference to FIG. 1, the process begins with a base web 11 of woven fiberglass or any material similar in flexibility, strength and weatherability. The web is coated on one side with a thin layer 12 of foam plastic, which adheres well to the fibers of the base web. The foam layer acts as a bonding agent to facilitate joining the subsequent constituents to form the finished composite.

The foam coated web is passed under a feed roller 13 which is supplied with a liquid adhesive 14. The adhesive 14 is evenly applied to the foam surface of the base web as a thin layer 16. The web is then passed under a series of shaker dropper hoppers 17 and 18. The hopper 17 drops a layer 19 of small aggregate 21 onto the wet adhesive surface, and the hopper 18 then drops a layer 22 of fine aggregate 23. It may be appreciated that the fine aggregate fills in the interstitial spaces between the small aggregate stones, forming a continuous composite surface on the web.

The adhesive is then dried and cured by passing the web through an oven 25 which heats both upper and lower surfaces of the web and the composite. All of the small and fine aggregate stones which are in substantial contact with the adhesive are bonded to the adhesive and to the web. The unbonded stones are removed by passing the web through a vacuum hood 26 which draws away the loose aggregate in the rushing airstream. The order of the two previous steps may be reversed as required by the manufacturing process.

The web and composite are then passed under a sprayer installation where a sealant compound is sprayed onto the composite layer, coating the surfaces of the aggregate stone and also any exposed adhesive surface. The sealant, which may comprise any common acrylic sealer compound known in the prior art, forms a waterproof surface at the exterior of the composite layer, and also enhances the color of the aggregate stone.

The web is then passed under radiant heat lamps 27 which dry the sealant rapidly, forming the finished wall covering material. The web is wound onto rolls 28, and is ready for shipping to an installation site. At the site, the wall covering material may be unrolled and trimmed to proper size, and applied to a wall surface with adhesive which is suitably tacky to retain the material while the adhesive dries and cures.

It may be appreciated that the wall covering of the present invention includes an exterior layer 31 of stone aggregate which is sealed against water penetration. The stone aggregate is also very resistant to ultraviolet radiation, wind, and the other natural elements. Thus the wall covering is well-suited to use as an exterior wall surface. The stone aggregate provides a smooth yet textured surface, and the natural variations in color of the aggregate generates visual interest in the random patterns of color and contrast.

I claim:

1. A method for fabricating a flexible wall covering material including providing a flexible fabric web, applying and curing a thin foam bonding layer to one surface of the web, applying an adhesive layer to the foam bonding layer, applying small aggregate and fine aggregate successively onto the adhesive layer, heating and curing the adhesive to bond the composite aggregate to the web, removing the unbonded aggregate from the cured composite, applying a sealer onto the aggregate surface of the composite, drying said sealer by radiant heat to seal the adhesive and the aggregate and emphasize the color of the aggregate.

2. The method of claim 1, wherein said adhesive is applied to said fabric web by a contact roller impinging on said web.

3. The method of claim 1, wherein said aggregate is applied by at least one shaker dropper hopper disposed above the web as the web translates thereby.

4. The method of claim 1, wherein the step of removing the unbonded aggregate includes passing the web through a vacuum hood assembly.

5. The method of claim 1, wherein said web is formed of a woven fiberglass composition.

6. An exterior wall covering material, including a web formed of fiberglass material, a bonding layer of thin foam plastic material adhered to one side of said web, an adhesive layer applied to the foam bonding layer, a composite aggregate layer adhered in and bonded to said adhesive layer, and a sealant coating applied to the outer surfaces of said adhesive layer and of said aggregate layer to form a waterproof and weatherproof outer surface.

* * * * *